US006851938B2

(12) United States Patent
Ding et al.

(10) Patent No.: US 6,851,938 B2
(45) Date of Patent: Feb. 8, 2005

(54) MAGNETIC PUMPING SYSTEM

(75) Inventors: Yuqing Ding, Baltimore, MD (US); M. Douglas Levan, Brentwood, TN (US)

(73) Assignee: Vanderbilt University, Nashville, TN (US)

( * ) Notice: Subject to any disclaimer, the term of this patent is extended or adjusted under 35 U.S.C. 154(b) by 74 days.

(21) Appl. No.: 10/228,438

(22) Filed: Aug. 27, 2002

(65) Prior Publication Data

US 2003/0044285 A1 Mar. 6, 2003

Related U.S. Application Data

(60) Provisional application No. 60/315,416, filed on Aug. 28, 2001.

(51) Int. Cl.[7] .......................... F04B 17/04; F04B 39/10; F16K 17/00
(52) U.S. Cl. ........................ 417/418; 417/53; 417/417; 417/568; 137/512; 137/540; 137/903
(58) Field of Search .......................... 417/53, 417, 418, 417/568, 567; 137/512, 540, 903

(56) References Cited

U.S. PATENT DOCUMENTS

| | | | | |
|---|---|---|---|---|
| 461,295 A | * | 10/1891 | Van Depoele | 417/418 |
| 1,783,611 A | * | 12/1930 | Gohring | 417/418 |
| 2,595,878 A | * | 5/1952 | Parsons | 137/903 |
| 2,686,280 A | * | 8/1954 | Strong et al. | 417/418 |
| 2,701,331 A | * | 2/1955 | Holst | 417/418 |
| 3,125,963 A | * | 3/1964 | Whitley | 417/568 |
| 3,192,949 A | * | 7/1965 | De See | 137/540 |
| 3,208,388 A | * | 9/1965 | Glasgow | 417/568 |
| 4,231,722 A | * | 11/1980 | Teichmann | 417/418 |
| 4,314,797 A | * | 2/1982 | Gerwin | 417/418 |
| 4,350,266 A | * | 9/1982 | Hetherington et al. | 222/40 |
| 4,363,980 A | * | 12/1982 | Petersen | 310/15 |
| 4,824,335 A | | 4/1989 | Lubitz et al. | |
| 5,017,100 A | * | 5/1991 | Arkans | 137/903 |
| 5,252,043 A | | 10/1993 | Bolding et al. | |
| 5,713,728 A | | 2/1998 | Salamey | |
| 5,899,672 A | | 5/1999 | Salamey | |

OTHER PUBLICATIONS

Operating Manual for "Magnetic Pump", Model No. 2330; by Ruska Instrument Corporation; Houston, Texas.
"Compact, magnetic recirculating pump for wide–range temperature and pressure operation" by H. Mansootlan, E.F. Capps, H. L. Gielen, P.T. Eubank and K.R. Hall; *Review of Scientific Instruments*, Oct. 1975, vol. 45 No. 10, pp. 1350–1351.
"Simple high–pressure magnetic pump" by David H. Ziger and Charles A. Eckert; *Review of Scientific Instruments*, Aug. 1982, vol. 53 No. 8, pp. 1296–1297.
"Magnetic circulating pumps for use over wide ranges of temperature and pressure" by W..J. Rogers, F. Fontalba, E.F. Capps, J.C. Holste, K.N. Marsh and K.A. Hall; *Review of Scientific Instruments*, Jan. 1988, vol. 59 No. 1, pp. 193–194.

* cited by examiner

Primary Examiner—Cheryl J. Tyler
Assistant Examiner—Timothy P. Solak
(74) Attorney, Agent, or Firm—Williams, Morgan & Amerson, P.C.

(57) ABSTRACT

A magnetic pumping system includes a pump, capable of urging a fluid therefrom during a forward stroke and a return stroke, having a piston disposed within a cylinder defined by a pump body, and a driver disposed external to the pump body. The driver is capable of moving the piston by a magnetic field interaction between the driver and the piston. The system further includes a check valve bridge, spaced away from the pump and in fluid communication with the cylinder, capable of allowing ingress and egress of the fluid into and out of the cylinder in response to a movement by the piston.

22 Claims, 5 Drawing Sheets

US 6,851,938 B2

MAGNETIC PUMPING SYSTEM

CROSS REFERENCE TO RELATED APPLICATIONS

This application claims the benefit of U.S. Provisional Application No. 60/315,416, filed Aug. 28, 2001.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract number DAAM01-98-C-0002 awarded by the U.S. Army Chemical and Biological Defense Command.

BACKGROUND OF THE INVENTION

1. Field of the Invention

This invention relates to a method and apparatus for circulating a fluid within a closed system.

2. Description of the Related Art

It is often desirable to circulate fluids within a closed system to prepare fluid mixtures, to equilibrate fluid phases, or for other purposes. For example, in gas-solid adsorption equilibrium testing, a gas mixture containing a chemical vapor and an inert gas is circulated through an adsorber packed with adsorbent particles. Magnetic piston pumps have traditionally been used in such applications, since such pumps require no physical connection between the piston and the driver driving the piston.

Such conventional magnetic piston pumps generally include a ferromagnetic piston disposed within a cylinder defined by a pump body. The pump further includes a driver including a magnet that is disposed external to the pump body. As the driver is moved in a first direction with respect to the pump body, the magnetic attraction between the driver and the piston urges the piston to move within the cylinder commensurate with the driver. In this way, fluid is drawn into the cylinder. Once the cylinder has been filled, the direction of the driver is reversed. The magnetic attraction between the driver and the piston urges the piston to move within the cylinder commensurate with the driver. The fluid, previously drawn into the cylinder, flows through the piston, through a series of check valves, and out of the pump.

Conventional magnetic piston pumps are generally capable of producing a maximum flow rate of about 100 cm$^3$ per minute, which is insufficient for many applications. Their low flow rate capability is due in large part to limitations of the magnetic attraction between the driver and the piston and to their ability to pump fluid only during one stroke of the pump cycle. Further, check valves that are integral with the pump often wear quickly and typically require the pump to be disassembled for repairs to be made. The piston of such a pump also often wears quickly, since it typically slides directly against an interior wall of the cylinder in which it operates. This wear often produces minute particles of the piston and/or cylinder wall, which may contaminate the fluid flowing through the pump.

The present invention is directed to overcoming, or at least reducing, the effects of one or more of the problems set forth above.

SUMMARY OF THE INVENTION

In one aspect of the present invention, a magnetic pumping system is provided. The magnetic pumping system includes a pump, capable of urging a fluid therefrom during a forward stroke and a return stroke, having a piston disposed within a cylinder defined by a pump body, and a driver disposed external to the pump body. The driver is capable of moving the piston by a magnetic field interaction between the driver and the piston. The system further includes a check valve bridge, spaced away from the pump and in fluid communication with the cylinder, capable of allowing ingress and egress of the fluid into and out of the cylinder in response to a movement by the piston.

In another aspect of the present invention, a method for pumping a fluid is provided. The method includes magnetically moving a piston in a first direction within a cylinder, allowing ingress of a fluid into a first portion of the cylinder in response to the movement by the piston in the first direction, and allowing egress of the fluid out of a second portion of the cylinder in response to the movement by the piston in the first direction. The method further includes magnetically moving the piston in a second direction, which is counter to the first direction, within the cylinder, allowing egress of the fluid out of the first portion of the cylinder in response to the movement by the piston in the second direction, and allowing ingress of the fluid into the second portion of the cylinder in response to the movement by the piston in the second direction.

In yet another aspect of the present invention, an apparatus for pumping fluid is provided. The apparatus includes means for magnetically moving a piston in a first direction within a cylinder, means for allowing ingress of a fluid into a first portion of the cylinder in response to the movement by the piston in the first direction, and means for allowing egress of the fluid out of a second portion of the cylinder in response to the movement by the piston in the first direction. The apparatus further includes means for magnetically moving the piston in a second direction, which is counter to the first direction, within the cylinder, means for allowing egress of the fluid out of the first portion of the cylinder in response to the movement by the piston in the second direction, and means for allowing ingress of the fluid into the second portion of the cylinder in response to the movement by the piston in the second direction.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1A:
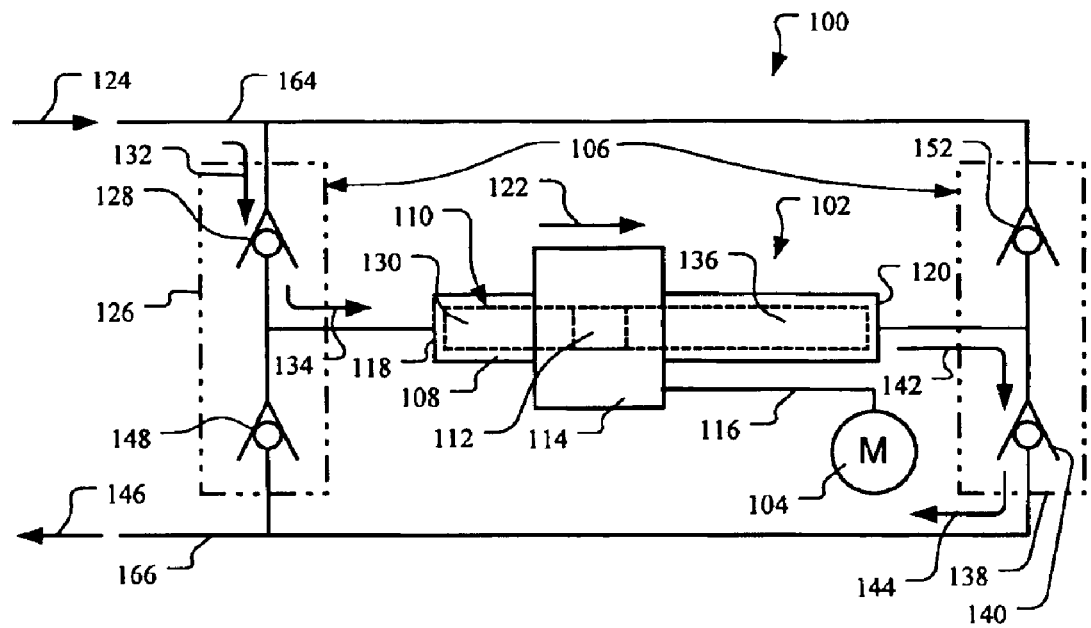
FIG. 1A is a stylized schematic diagram of an embodiment of a magnetic pumping system according to the present invention in a forward stroke operation.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 1B:
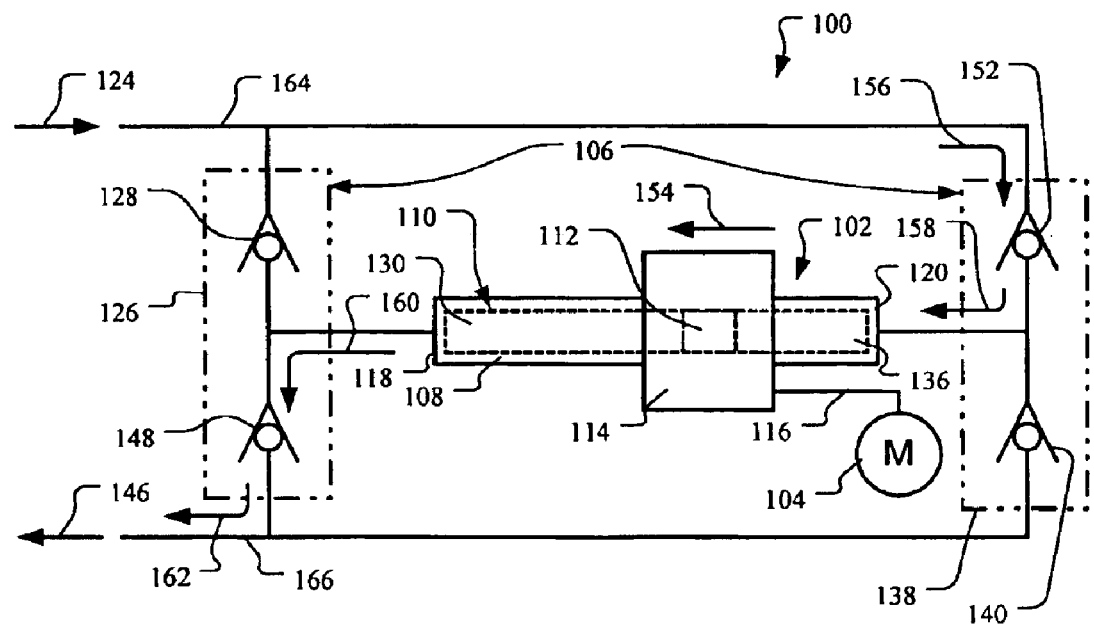
FIG. 1B is a stylized schematic diagram of the magnetic pumping system of FIG. 1A in a return stroke operation.

FIGS. 1A and 1B illustrate an embodiment of a magnetic pumping system 100 according to the present invention. The system 100, in the illustrated embodiment, includes a double-acting, magnetically-driven piston pump 102 that is adapted to be driven by a motor 104 and is fluidly coupled with a check valve bridge 106. The pump 102 comprises a pump body 108 defining a cylinder 110, a piston 112 slidably disposed within the cylinder 110, and a driver 114 slidably disposed external to the pump body 108.

The driver 114 is mechanically coupled with the motor 104 by a link 116 such that, as the motor 104 operates, the driver 114 is moved between locations proximate a first end 118 of the pump body 108 and a second end 120 of the pump body 108. In one embodiment, the link 116 comprises a cord, such as a polyester cord, that transfers motion from the motor 104 to the driver 114. The piston 112 and the driver 114 each comprise magnets (not shown in FIG. 1A or 1B) that attract each other, as will be described later. Thus, as the driver 114 is moved along the length of the pump body 108, the piston 112 is moved along the length of the cylinder 110 by the magnetic attractive force therebetween.

A forward stroke of the pump 102 is illustrated in FIG. 1A. As the driver 114 and the piston 112 are moved in a direction indicated by an arrow 122, fluid is drawn into the system 100, as indicated by an arrow 124. The fluid enters a first branch 126 of the check valve bridge 106 and flows through a first check valve 128 of the first branch 126 into a first portion 130 of the cylinder 110, as indicated by the arrows 132, 134. At the same time, the piston 112 forces fluid out of a second portion 136 of the cylinder 110. The fluid flows out of the cylinder 110, entering a second branch 138 of the check valve bridge 106 and flows through a first check valve 140 of the second branch 138, as indicated by arrows 142, 144. The fluid then flows out of the system 100, as indicated by an arrow 146. As the pump 102 operates as shown in FIG. 1A, a second check valve 148 of the first branch 126 and a second check valve 152 of the second branch 138 inhibit the flow of fluid therethrough.

FIG. 1B illustrates a return stroke of the pump 102. As the driver 114 and the piston 112 are moved in a direction indicated by an arrow 154, fluid is drawn into the system 100, as indicated by the arrow 124. The fluid enters the second branch 138 of the check valve bridge 106 and flows through the second check valve 152 of the second branch 138 into the second portion 136 of the cylinder 110, as indicated by the arrows 156, 158. At the same time, the piston 112 forces fluid out of the first portion 130 of the cylinder 110. The fluid flows out of the cylinder 110, entering the first branch 126 of the check valve bridge 106 and flowing through the second check valve 148 of the first branch 126, as indicated by arrows 160, 162. The fluid then flows out of the system 100, as indicated by the arrow 146. As the pump 102 operates as shown in FIG. 1B, the first check valve 128 of the first branch 126 and the first check valve 140 of the second branch 138 inhibit the flow of fluid therethrough.

Each of the check valves 128, 140, 148, 152 operates in response to the movement by the piston 112. During the forward stroke of the pump 102, the check valves 128, 140 open in response to the movement of the piston in a first direction (indicated by the arrow 122), such that fluid is routed therethrough. During the return stroke of the pump 102, the check valves 148, 152 open in response to the movement by the piston in a second direction (indicated by the arrow 154), such that fluid is routed therethrough.

The system 100 may pump a greater volume of fluid per unit time than conventional magnetic pump systems by pumping fluid during both the forward stroke (shown in FIG. 1A) and the return stroke (shown in FIG. 1B) of the pump 102. The check valve bridge 106 allows the use of one input conduit 164 to feed the system 100 and one output conduit 166 to transmit fluid from the system 100.

Figure 2:
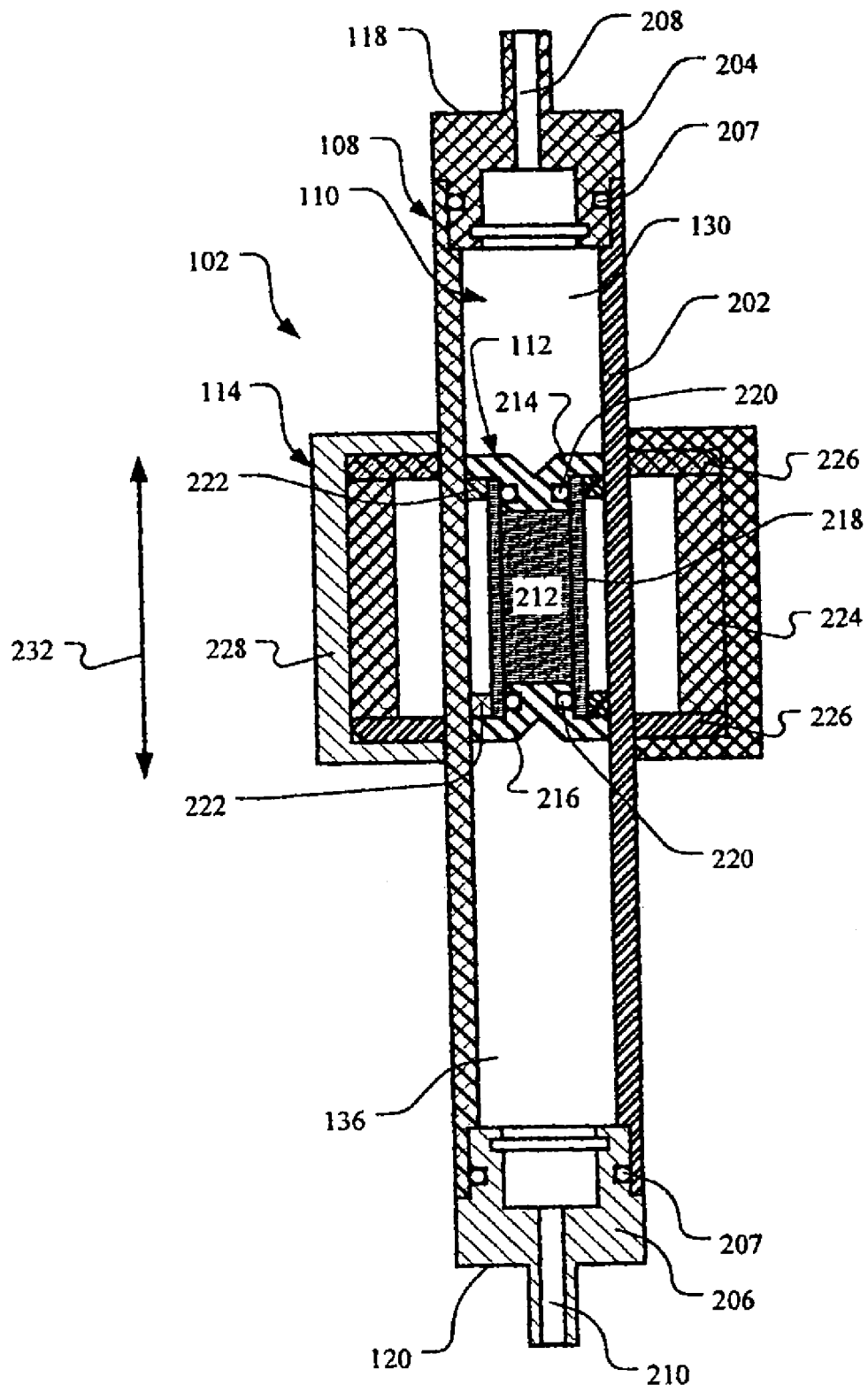
FIG. 2 is cross-sectional view of an embodiment of a magnetic piston pump according to the present invention.

FIG. 2 illustrates an embodiment of the pump 102 (shown in FIG. 1) according to the present invention. As previously discussed, the pump 102 comprises a pump body 108 defining a cylinder 110, a piston 112 slidably disposed within the cylinder 110, and a driver 114 slidably disposed external to the pump body 108. The pump body 108 comprises a cylinder wall 202 sealingly engaged at either end with a first cylinder plug 204 and a second cylinder plug 206. Cylinder plug seals 207 may be used to seal the interfaces between the cylinder plugs 204, 206 and the cylinder wall 202 to inhibit the flow of fluid therethrough. The cylinder plug seals 207 may be made of an elastomer, a fluoroelastomer (such as Viton®, manufactured by DuPont Dow Elastomers), or any other suitable material. The seals 207 may be disposed in the cylinder plugs 204, 206, as shown, or alternatively may be disposed in the cylinder wall 202. Each of the cylinder plugs 204, 206 defines a bore 208, 210, respectively, in fluid communication with the cylinder 110 and the check valve bridge 106.

The cylinder 110 is separated into the first portion 130 and the second portion 136 by the piston 112. In one embodiment, the cylinder wall 202 and the cylinder plugs 204, 206 are made from type 316 stainless steel. The invention, however, is not so limited. Rather, the cylinder wall 202 and the cylinder plugs 204, 206 may be made from any material suitable for the intended service of the pump 102.

Still referring to FIG. 2, the piston 112 includes a piston magnet 212 disposed between a first piston plug 214 and a second piston plug 216. A retaining member 218 couples the first piston plug 214, the piston magnet 212, and the second piston plug 216. In one embodiment, a pair of piston plug seals 220, disposed between each of the piston plugs 214, 216 and the retaining member 218, inhibits fluid from entering an interior of the retaining member 218. The piston plug seals 220 may be made of an elastomer, a fluoroelastomer (such as Viton®, manufactured by DuPont Dow Elastomers), or any other suitable material. The seals 220 may be disposed in the piston plugs 214, 216, as illustrated, or alternatively may be disposed in the retaining member 218. In one embodiment, the piston magnet 212 comprises a NeFeB alloy; however, the present invention is not so limited. Rather, the piston magnet 212 may comprise any magnetic material, such as a SmCo alloy or an AlNiCo alloy.

The piston plugs 214, 216 may be made of any material suitable for the intended use of the pump 102. In one embodiment, the piston plugs 214, 216 comprise a ferromagnetic material, such as type 416 stainless steel. At least one piston seal 222 is disposed external to the retaining member 218 for inhibiting fluid from flowing between the piston 112 and the cylinder wall 202. The piston seals 222 may comprise a fluoropolymer, such as Teflon®, or any other suitable material that inhibits fluid from passing between the piston seals 222 while allowing free movement of the piston 112 along the length of the cylinder 110.

Still referring to FIG. 2, the driver 114 comprises a driver magnet 224 disposed between a pair of washers 226. The driver magnet 224 and the washers 226 are housed within a driver body 228. The driver magnet 224 may be made of any magnetic material and, in one embodiment, is magnetized in an axial direction (i.e., generally perpendicular to the washers 226). The driver magnet 224 may be made of an AlNiCo alloy, an NeFeB alloy or an SmCo alloy, for example. Preferably, the washers 226 generally direct the magnetic field radiating from the driver magnet 224 toward the piston 112, thus increasing the influence of the driver magnet 224 on the piston 112. In one embodiment the washers 226 are made of steel; however, in preferred embodiments, the washers 226 will be made of any desired material, such as a ferromagnetic material, capable of generally directing the magnetic field radiating from the driver magnet 224 toward the piston 112.

In this particular embodiment, the driver magnet 224, the washers 226, the piston magnet 212, and the piston plugs 214, 216 (if they are magnetic) interact to form a closed-loop magnetic field, which provides a strong magnetic driving force and may increase the stability of the magnets 212, 224, especially at high temperatures. Thus, as the driver 114 is moved along the pump body 108 corresponding to an arrow 232, the magnetic attraction between the driver magnet 224, the washers 226, the piston magnet 212, and the piston plugs 214, 216 (if they are magnetic) urges the piston 112 commensurately along the length of the cylinder 110.

Figure 3:
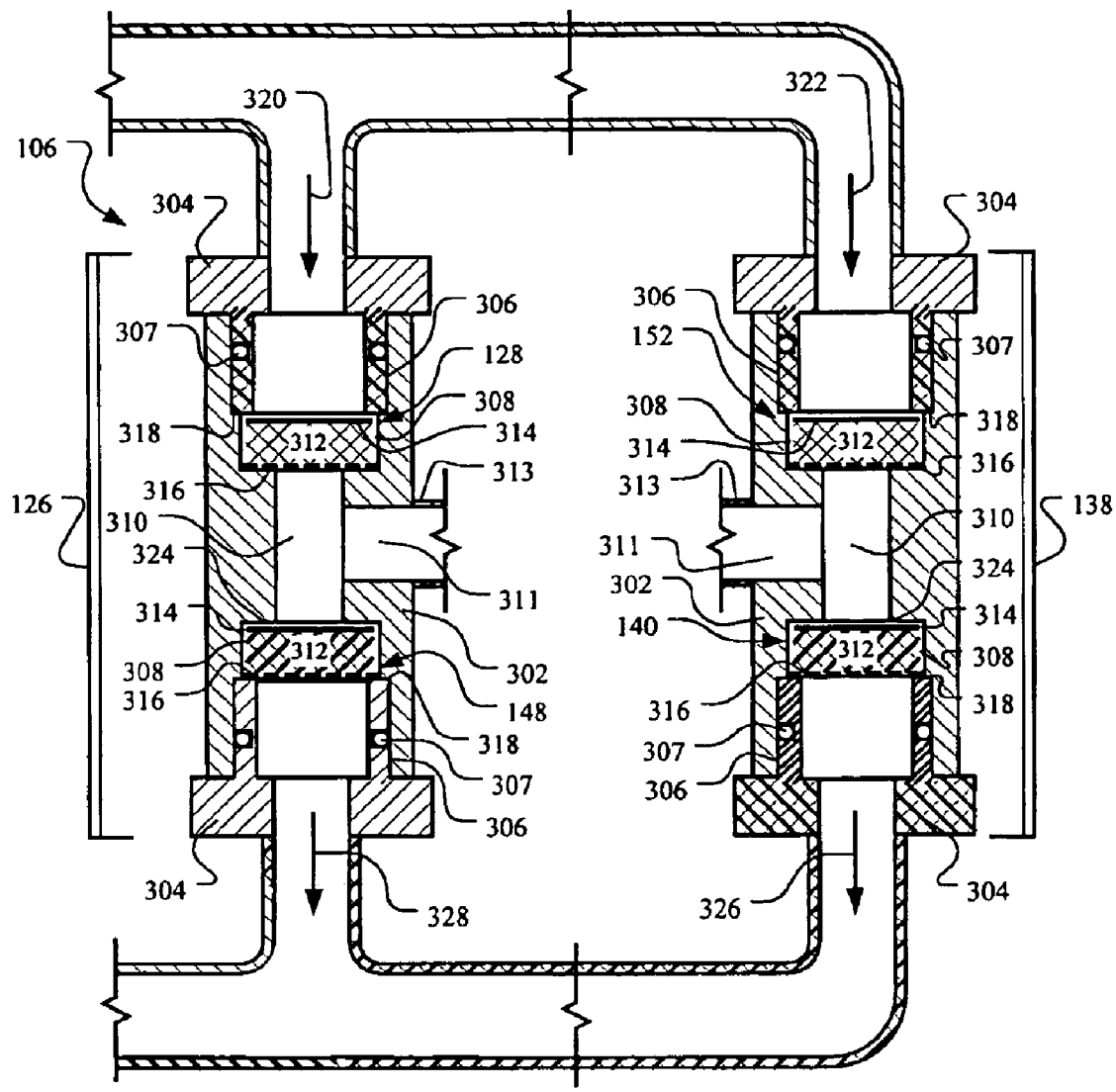
FIG. 3 is a cross-sectional view of an embodiment of a check valve bridge according to the present invention.

FIG. 3 illustrates an embodiment of the check valve bridge 106 according to the present invention. As described previously and illustrated in FIGS. 1A and 1B, the check valve bridge 106 includes a first branch 126, comprising a first check valve 128 and a second check valve 148, and a second branch 138, comprising a first check valve 140 and a second check valve 152. Each of the branches 126, 138 comprises a check valve body 302 and a pair of end caps 304 received in bores 306 defined by the check valve body 302 and sealingly engaged with the check valve body 302. End cap seals 307 may be used to seal the interfaces between the end caps 304 and the check valve body 302 to inhibit the flow of fluid therebetween. The end cap seals 307 may be made of an elastomer, a fluoroelastomer (such as Viton®, manufactured by DuPont Dow Elastomers), or any other suitable material. Each of the valve bodies 302 further defines a pair of chambers 308 in which elements of the check valves 128, 140, 148, 152 are disposed, a passageway 310 fluidly coupling the chambers 308, and an inlet/outlet port 311 fluidly coupling the passageway 310 and a conduit 313 leading to the pump 102. Each of the end caps 304 defines a passageway 310 therethrough for passage of fluid into or out of the check valve body 302.

Each of the check valves 128, 140, 148, 152 comprises a spring member 312 and a sealing member 314 disposed in the chamber 308. In one embodiment, the sealing member 314 comprises a fluoropolymer film, such as a Teflon® film. The spring member 312 may comprise a portion of fibrous material, such as glass wool, in one embodiment and may have fibers curled in a direction generally perpendicular to the sealing member 314. Referring in particular to check valve 128, the spring member 312 urges the sealing member 314 toward a sealing surface 318 of the end cap 304 such that the sealing member 314 contacts the sealing surface 318 in the absence of fluid forces on the sealing member 314. The pressure exerted on the sealing member 314 by the spring member 312, however, is light; thus, the fluid pressure (i.e., the cracking pressure) required to urge the sealing member 314 away from the sealing surface 318 of the end cap 304 is low. This configuration allows fluid to flow substantially only in a direction corresponding to an arrow 320. Fluid flowing in a direction counter to that corresponding to the arrow 320 urges the sealing member 314 against the sealing surface 318 of the end cap 304, thus inhibiting the flow of fluid therethrough.

Still referring to FIG. 3, the check valve 152 has a configuration corresponding to that of the check valve 128. Thus, the sealing member 314 of the check valve 152 contacts the sealing surface 318 of the end cap 304, thus allowing fluid to flow substantially only in a direction corresponding to an arrow 322 and inhibiting the flow of fluid in a direction counter to that corresponding to the arrow 322.

While the check valves 140, 148 also include the spring member 312 between the sealing member 314 and, in some embodiments, the screen 316, their orientations with respect to the end caps 304 differ from those in the check valves 128, 152. Referring in particular to the check valve 140, the spring member 312 urges the sealing member 314 toward a sealing surface 324 of the check valve body 302 such that the sealing member 314 contacts the sealing surface 324 in the absence of fluid forces on the sealing member 314. The pressure exerted on the sealing member 314 by the spring member 312, however, is light; thus, the fluid pressure (i.e., the cracking pressure) required to urge the sealing member 314 away from the sealing surface 324 of the check valve body 302 is low. This configuration allows fluid to flow substantially only in a direction corresponding to an arrow 326. Fluid flowing in a direction counter to that corresponding to the arrow 326 urges the sealing member 314 against the sealing surface 324 of the check valve body 302, thus inhibiting the flow of fluid therethrough.

Still referring to FIG. 3, the check valve 148 has a configuration corresponding to that of the check valve 140. Thus, the spring member 312 urges the sealing member 314 toward a sealing surface 324 of the check valve body 302, thus allowing fluid to flow substantially only in a direction corresponding to an arrow 328 and inhibiting the flow of fluid in a direction counter to that corresponding to the arrow 328.

Figure 4:
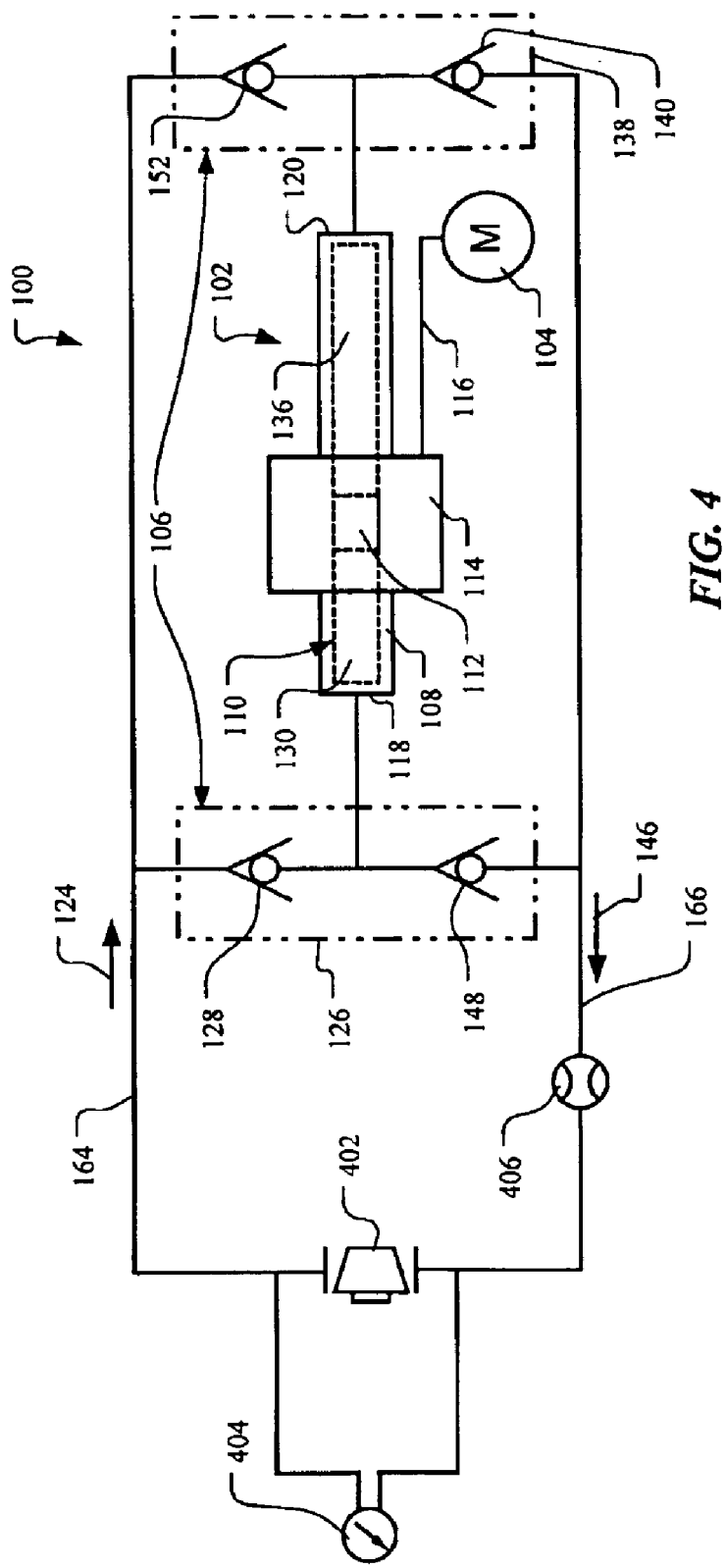
FIG. 4 is a stylized schematic diagram of a test setup using the magnetic pumping system of FIGS. 1A and 1B.

FIG. 4 illustrates a setup for testing performance characteristics of the magnetic pump system 100. A plug valve 402 was installed between the input conduit 164 and the output conduit 166 to simulate a pressure drop that might be produced by a test bed used in, for example, vapor-liquid equilibrium, gas-adsorption equilibrium, high pressure gas chemical reaction, or biological gas-phase tests. A pressure gauge 404 was installed across the plug valve 402 to measure the pressure drop across the plug valve 402. A flow meter 406 was installed in the output conduit 166 to measure the flow rate of the fluid outputted from the system 100. In the illustrated test setup, the pump 102 had a volumetric displacement of 77.6 $cm^3$ per cycle. The chambers 308 of the check valve bodies 302 were about 14 mm in diameter and about 6 mm in length. The motor 104 used to drive the driver 114 was a 0–240 revolution-per-minute (RPM) DC gear motor capable of delivering about 44 watts of power.

Figure 5:
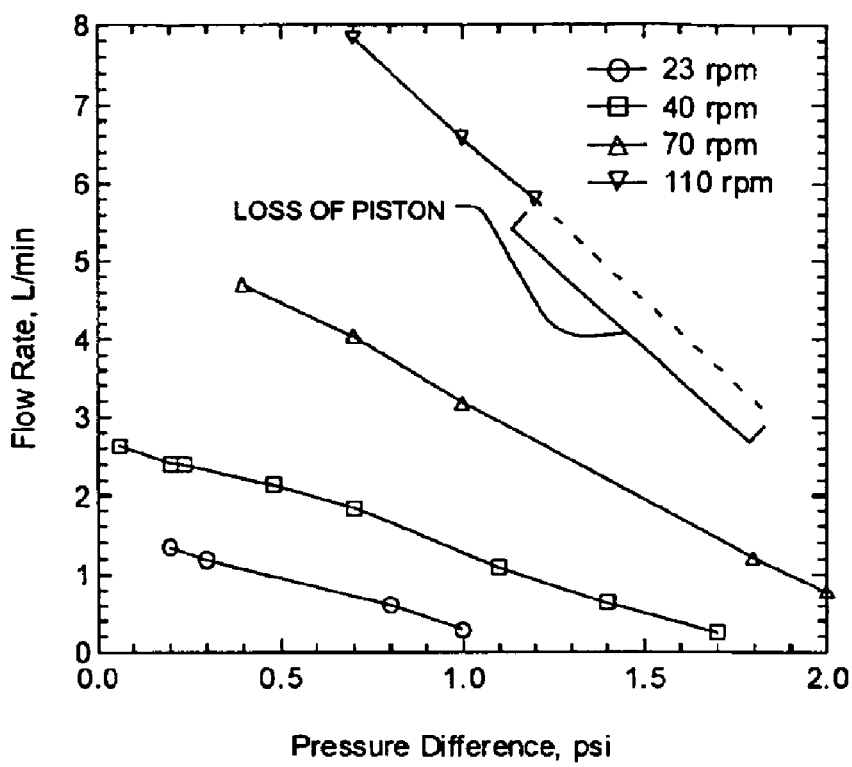
FIG. 5 is a graphical representation of flow rate and pressure difference data taken using the test setup of FIG. 4.
Figure 6:
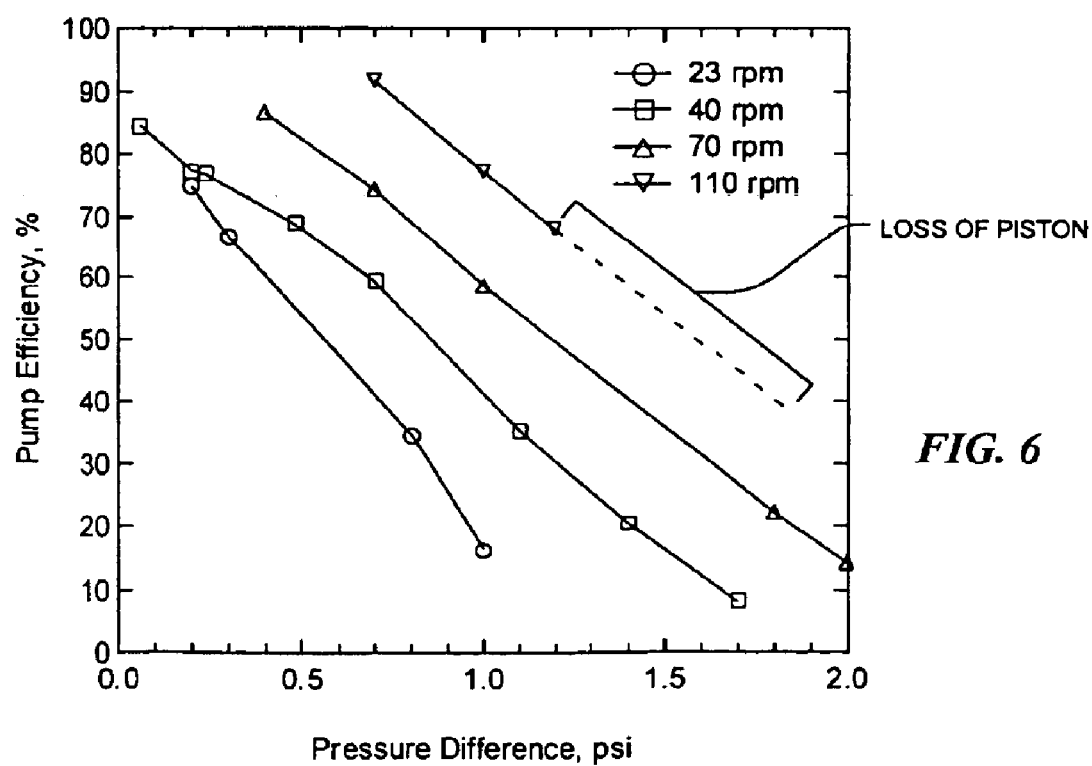
FIG. 6 is a graphical representation of pump efficiency and pressure difference data taken using the test setup of FIG. 4.

FIGS. 5 and 6 illustrate exemplary performance characteristics of the magnetic pumping system 100 using the test setup shown in FIG. 4. The test was performed at motor speeds of 23 RPM, 40 RPM, 70 RPM, and 110 RPM. Generally, one revolution of the motor corresponds to one complete cycle (i.e., a forward stroke and a return stroke) of the pump 102. Data shown in FIGS. 5 and 6 indicate that the pump 102 achieved higher efficiencies at lower pressure drops. Further, higher motor speeds (and thus greater cycle rates of the pump 102) produce greater efficiencies. However, at high motor speeds and high pressure differences, the magnetic attraction between the piston 112 and the driver 114 may not be sufficient to overcome the fluid forces to pump the fluid through the system 100, as indicated by the "loss of piston" data segment in each of FIGS. 4 and 5. In this test, the system 100 was capable of producing a flow rate near eight liters per minute with a pump efficiency of greater than 90 percent. Conventional pumps, such as a Ruska® model 2330-802 pump, generally have a maximum flow rate of about 0.1 liters per minute and a low pumping efficiency (e.g., less than 10 percent).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A magnetic pumping system, comprising:
   a pump, capable of urging a fluid therefrom during a forward stroke and a return stroke, having a piston disposed within a cylinder defined by a pump body, and a driver disposed external to the pump body, wherein the driver is capable of moving the piston by a magnetic field interaction between the driver and the piston; and
   a check valve bridge, spaced away from the pump and in fluid communication with the cylinder, capable of allowing ingress and egress of the fluid into and out of the cylinder in response to a movement by the piston, wherein the piston comprises:
   a first piston plug;
   a second piston plug;
   a piston magnet disposed between the first piston plug and the second piston plug;
   a retaining member for housing the piston magnet and coupling the first piston plug and the second piston plug; and
   at least one piston seal disposed external to the retaining member for inhibiting a flow of fluid between the piston and the cylinder wall.

2. A magnetic pumping system, according to claim 1, wherein the pump body further comprises:
   a cylinder wall defining the cylinder and having a first end and a second end;
   a first cylinder plug sealingly engaged with the first end of the cylinder wall and defining a bore therethrough in fluid communication with the cylinder and the check valve bridge; and
   a second cylinder plug sealingly engaged with the second end of the cylinder wall and defining a bore therethrough in fluid communication with the cylinder and the check valve bridge.

3. A magnetic pumping system, according to claim 2, wherein the pump body further comprises a pair of seals, disposed between the cylinder plugs and the cylinder wall, for inhibiting a flow of the fluid therebetween.

4. A magnetic pumping system, according to claim 3, wherein each of the pair of seals comprises a material selected from the group consisting of an elastomer and a fluoroelastomer.

5. A magnetic pumping system, according to claim 1, wherein the piston further comprises a pair of seals, disposed between the piston plugs and the retaining member, for inhibiting a flow of the fluid therebetween.

6. A magnetic pumping system, according to claim 5, wherein each of the pair of elastomeric seals comprises a material selected from the group consisting of an elastomer and a fluoroelastomer.

7. A magnetic pumping system, according to claim 1, wherein each of the piston plugs comprise a ferromagnetic material.

8. A magnetic pumping system, according to claim 1, wherein the piston magnet comprises a material selected from the group consisting of an NeFeB alloy, an AlNiCo alloy, and an SmCo alloy.

9. A magnetic pumping system, according to claim 1, wherein the at least one piston seal comprises a fluoropolymer.

10. A magnetic pumping system, according to claim 1, further comprising a motor linked with the driver for actuating the driver.

11. A magnetic pumping system, according to claim 1, wherein the check valve bridge further comprises:
    a first branch in fluid communication with a first portion of the cylinder for allowing ingress and egress of the fluid into and out of the first portion of the cylinder in response to the movement by the piston; and
    a second branch in fluid communication with a second portion of the cylinder for allowing ingress and egress of the fluid into and out of the second portion of the cylinder in response to the movement by the piston.

12. A magnetic pumping system, according to claim 11, wherein each of the first branch and the second branch comprises:
    a first check valve capable of allowing ingress of the fluid into the cylinder in response to the movement by the piston; and
    a second check valve capable of allowing egress of the fluid out of the cylinder in response to the movement by the piston.

13. A magnetic pumping system, comprising:
    a pump, capable of urging a fluid therefrom during a forward stroke and a return stroke, having a piston disposed within a cylinder defined by a pump body, and a driver disposed external to the pump body, wherein the driver is capable of moving the piston by a magnetic field interaction between the driver and the piston; and a check valve bridge, spaced away from the pump and in fluid communication with the cylinder, capable of allowing ingress and egress of the fluid into and out of the cylinder in response to a movement by the piston, wherein the driver further comprises:

a driver body;

a pair of washers disposed within the driver body; and a driver magnet comprising one of an NeFeB alloy, an AlNiCo alloy, and an SmCo alloy disposed within the driver body between the washers.

14. A magnetic pumping system, according to claim 13, wherein the driver magnet is magnetized in a direction generally perpendicular to the washers.

15. A magnetic pumping system, comprising:

a pump, capable of urging a fluid therefrom during a forward stroke and a return stroke, having a piston disposed within a cylinder defined by a pump body, and a driver disposed external to the pump body, wherein the driver is capable of moving the piston by a magnetic field interaction between the driver and the piston; and a check valve bridge, spaced away from the pump and in fluid communication with the cylinder, capable of allowing ingress and egress of the fluid into and out of the cylinder in response to a movement by the piston, wherein the check valve bridge further comprises:

a first branch in fluid communication with a first portion of the cylinder for allowing ingress and egress of the fluid into and out of the first portion of the cylinder in response to the movement by the piston; and a second branch in fluid communication with a second portion of the cylinder for allowing ingress and egress of the fluid into and out of the second portion of the cylinder in response to the movement by the piston, wherein each of the first branch and the second branch further comprises:

a check valve body defining a first chamber in fluid communication with a second chamber;

a first end cap sealingly engaged with a first end of the check valve body and defining a bore therethrough in fluid communication with the first chamber;

a second end cap sealingly engaged with a second end of the check valve body and defining a bore therethrough in fluid communication with the second chamber;

a first sealing member disposed within the first chamber proximate a sealing surface of the first end cap;

a first spring member, disposed within the first chamber, for urging the first sealing member toward the sealing surface of the first end cap;

a second sealing member disposed within the second chamber proximate a sealing surface of the check valve body; and a second spring member, disposed within the second chamber, for urging the second sealing member toward the sealing surface of the check valve body.

16. A magnetic pumping system, according to claim 15, wherein each of the first sealing member and the second sealing member comprises a fluoropolymer film.

17. A magnetic pumping system, according to claim 15, wherein each of the first spring member and the second spring member comprises a fibrous material portion.

18. A magnetic pumping system, according to claim 17, wherein the fibrous material portion comprises fibers curled in a direction generally perpendicular to the sealing member.

19. A magnetic pumping system, according to claim 15, wherein each of the first spring member and the second spring member comprises a portion of glass wool.

20. A magnetic pumping system, according to claim 19, wherein the glass wool portion comprises fibers curled in a direction generally perpendicular to the sealing member.

21. A magnetic pumping system, according to claim 15, wherein each of the first branch and the second branch further comprises a pair of seals, disposed between the end caps and the check valve body, for inhibiting a flow of the fluid therebetween.

22. A magnetic pumping system, according to claim 15, wherein each of the pair of seals comprises a material selected from the group consisting of an elastomer and a fluoroelastomer.

* * * * *